Dec. 25, 1928.
1,696,651
T. B. SLATE
REFRIGERATING APPARATUS AND METHOD
Original Filed Jan. 10, 1924
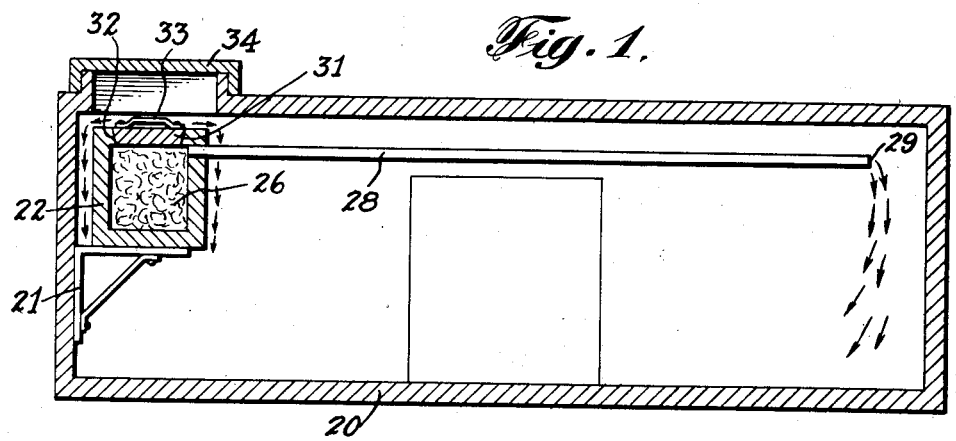
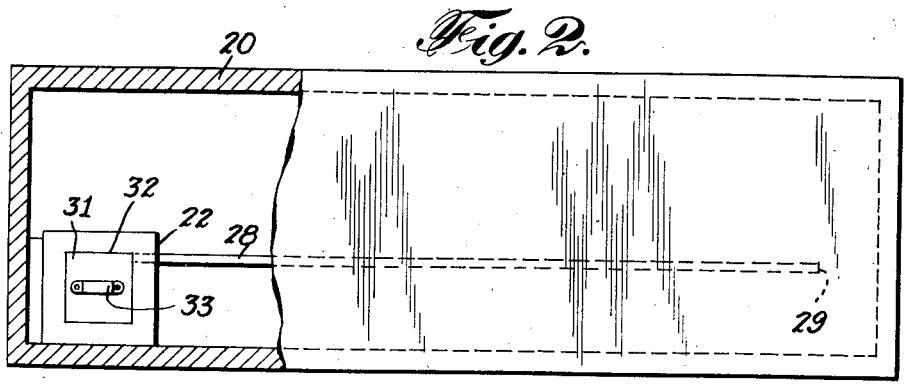
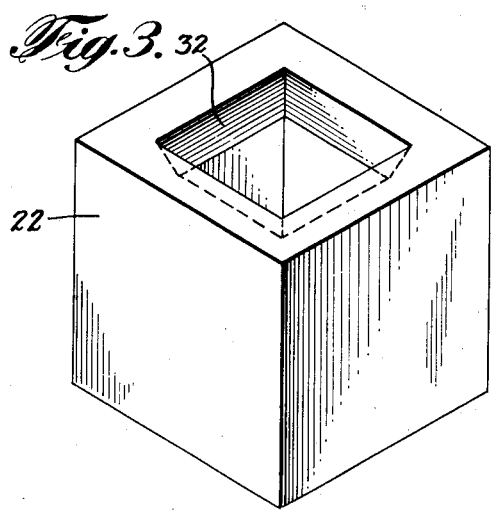
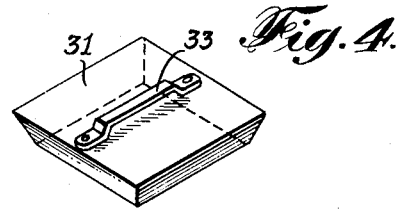
INVENTOR
Thomas B. Slate
BY
George C. Bean
his ATTORNEY Patented Dec. 25, 1928.

1,696,651

UNITED STATES PATENT OFFICE.

THOMAS B. SLATE, OF NEW YORK, N. Y., ASSIGNOR, BY MESNE ASSIGNMENTS, TO AMERICAN PATENTS DEVELOPMENT CORPORATION, OF NEW YORK, N. Y., A CORPORATION OF DELAWARE.

REFRIGERATING APPARATUS AND METHOD.

Original application filed January 10, 1924, Serial No. 685,482. Divided and this application filed September 27, 1924. Serial No. 740,163.

My present invention relates more particularly to refrigerating perishable products by means of frozen carbon dioxide enclosed in a suitably insulated container located within the refrigerator so that its insulated walls absorb heat from the atmosphere within the refrigerator and apply said heat to the frozen carbon dioxide which absorbs it as latent heat producing a corresponding amount of intensely cold carbon dioxide gas without any intermediate liquid state, such gas being discharged into the refrigerator atmosphere. Various forms of apparatus for this purpose are set forth in my Patent No. 1,511,306, granted Oct. 14, 1924, on my application, Serial No. 685,482, filed January 10, 1924, of which this application is a division.

The divisional subject matter of this present application concerns the special form of the apparatus wherein a container for the carbon dioxide ice is located in a refrigerator car or the like, in an upper part thereof, with its upper surface near but substantially below the ceiling. Two such equipments are shown in said prior application, but the present form is the one adapted to be charged with a large quantity of carbon dioxide snow or ice previously manufactured elsewhere.

In the description in said prior application I have explained that this equipment may be supplied with an outlet pipe whereby a container chamber in one end of the car has its outlet connected for discharge of the refrigerant gas in the remote end of the car. I find that discharging the refrigerant gas at a point remote from the heat absorbing surfaces of the container has many advantages.

The amount of heat absorption (refrigeration) afforded by heat absorption through the outer surfaces of the container is well known to be approximately one-half the refrigerant value of the ice, the other half being in the gas which results from the heat absorption. Hence, by the above described arrangement, equal refrigerant values are applied at each end of the car by a single container at one end thereof. Moreover, this arrangement promotes a stagnant condition of the atmosphere within the car. The intensely cold gas discharged at one end flows downward to the bottom of the car where it displaces upward the ordinary air, and also previously discharged and partially warmed layers of carbon dioxide gas. On the other hand, the heat absorption at the surface of the container is much less intense and takes effect on atmosphere that is lighter because its chilling is far less intense, and also because it is atmosphere naturally drawn from the upper part which is warmest and contains the most air.

Consequently the atmospheric circulation at the surface of the container tends to be an eddy current, downward past the surface of the container but not extending to the bottom of the car or seriously distributing the above described functioning of the heavy cold carbon dioxide gas.

My present invention may be more fully understood from the following description in connection with the accompanying drawings, wherein Fig. 1 is a view of a refrigerating chamber such as a refrigerator car 20, provided with a removable cover or skylight 34;

Fig. 2 is a top plan view of the same, partly in horizontal section;

Fig. 3 is a perspective view of the snow chamber 22; and

Fig. 4 is a perspective view of a suitable cover for the same.

Referring to Figs. 1 and 2, I provide a snow chamber 22 for any chamber 20, to be refrigerated, such as a refrigerator car. The snow chamber 22 is supported on a suitable bracket 21. The chamber 22 is provided with or formed of insulating material which may be balsa wood. This chamber is used as the insulated chamber for the refrigerant 26, which may be carbon dioxide either as snow or as ice and which may be manufactured elsewhere and delivered to the chamber to be refrigerated. I provide a suitable removable cover 34 on chamber 20 and a removable cover 31 on snow chamber 22, so that the space 26 is readily accessible for filling when needed. As the snow or ice 26 reverts to a gaseous state, it may be piped in any suitable manner to any desired part of the chamber 20, as by pipe 28 having its outlet 29 in the far end of said chamber.

Fig. 3 shows an enlarged view of chamber 22, and Fig. 4 an enlarged view of the cover 31 with a suitable handle 33. As stated in my said prior application, ordinary carbon dioxide snow as formed by expansion of the liquid carbon dioxide, is porous and light, but may be easily compressed to bricks of density much greater than water ice, a cubic foot of the carbon dioxide ice weighing approximately 100 lbs. Such carbon dioxide ice occupies about half the space and is also about twice as effective per pound as water ice, making it especially valuable for refrigerator cars where space and weight are both expensive.

As stated in my said prior application, it is quite commonly known that carbon dioxide has great preserving qualities, as it is one of the most inert gases known and, being absolutely free of all bacteria and other elements, causing deterioration of all perishable products, it causes them when completely immersed in the pure gas to maintain their present state of preservation for a very considerable length of time, and any product that has its pores completely filled with carbon dioxide gas will be preserved from decay practically regardless of temperature, so that a combination of slight refrigeration and complete exclusion of atmospheric air will preserve perishable products longer and more completely than any other type of refrigeration. Pure carbon dioxide has an affinity for moisture also that will prevent mold and other damaging effects caused by moisture. This fact is especially valuable in shipping grapes and other small fruits that mould very easily from the moisture of ordinary water-ice refrigeration.

With the apparatus shown in Figs. 1 and 2, it will be evident that the container 22 can have its capacity suitably proportioned to the total capacity and contents of the chamber 20 and can have an amount of insulation necessary for the extended refrigeration desired and to prevent such over refrigeration as would be damaging to the products to be refrigerated. Such an apparatus would keep the car cool enough for many purposes, even with the temperature range far enough above freezing to avoid all danger of freezing even under extreme conditions.

In all cases, the heavy intensely cold gas volatilized by heat absorbed through the walls of the container at one end of a car will escape as formed through the pipe 28 and outlet 29 in the upper part of the other end of the car. From the outlet, the gas will flow downward with very little diffusion, displacing the air upward and thus enveloping and preventing deterioration of the perishable products. At the same time the frigeration effect due to heat absorbed by the container walls at the other end of the car will be more or less localized because the temperature differences created are so very much smaller and because the atmosphere operated upon is primarily warmer and has a greater content of ordinary air.

I claim:

1. The method of refrigerating material within a chamber which includes establishing separate downflow currents of cooling medium in parts of the chamber remote from one another, the downflow in the first or primary region consisting entirely of the atmosphere of the chamber and the downflow in a second region consisting mainly of carbon dioxide gas; said first or atmospheric circulation being induced by enclosing frozen carbon dioxide in an air-tight imperfectly insulating container, whereby the cooling in said region is entirely by absorbing heat from the atmosphere through the outer surface of said air-tight imperfectly insulating container; permitting the carbon dioxide gas to escape from the container by overflow through a high level outlet at a pressure so low that no further liquid or solid can be formed by expansion, whereby said gas first displaces all of the air in said container and then itself escapes as formed; conducting the expelled air and afterwards the pure gas so formed to said remote region of said chamber and then permitting it to escape and flow downward by gravity to thereby establish said gas and air downflow in said remote region.

2. The method of refrigerating material within a chamber which includes establishing separate downflow by gravity of cooling medium in parts of the chamber remote from one another, the downflow in the first or primary region consisting entirely of the atmosphere from the top of the chamber and the downflow in a second region consisting mainly of carbon dioxide gas; said first or atmospheric circulation being induced by enclosing frozen carbon dioxide at a high level in the chamber, in an air-tight imperfectly insulating container, whereby the cooling in said region is entirely by absorbing heat from the atmosphere through the outer surface of said air-tight imperfectly insulating container; permitting the carbon dioxide gas to escape from the container by overflow through a high level outlet at a pressure so low that no further liquid or solid can be formed by expansion, whereby said gas first displaces all of the air in said container and then itself escapes as formed; conducting the expelled air and afterwards the pure gas so formed to said remote region of said chamber and then permitting it to escape at a high level and flow downward by gravity a considerable distance by gravity to thereby establish said gas and air downflow in said remote region.

3. A refrigerator for refrigerating perishable products, a container enclosing at approximately atmospheric pressure a supply of frozen carbon dioxide insulated from but located in and deriving heat from one part of the atmosphere containing said products and means for discharging the resultant cold gas into a part of said atmosphere remote from said container.

4. A refrigerator of substantially greater length than width for refrigerating perishable products comprising a container means enclosing a supply of frozen carbon dioxide located in and deriving heat from the upper part of the atmosphere near one end of the refrigerator and means permitting discharge of the resultant cold gas into a portion of said atmosphere horizontally remote from said container means; the insulation of the container means being substantial so that the normal temperature differential between said atmosphere and the heat absorbing surfaces of the container, will be relatively small.

Signed at New York city, in the county of New York, and State of New York, this 23rd day of September, A. D. 1924.

THOMAS B. SLATE.